(12) United States Patent
Akhtar

(10) Patent No.: US 8,072,840 B2
(45) Date of Patent: *Dec. 6, 2011

(54) FRACTURE CLUSTERS IDENTIFICATION

(75) Inventor: Azhar Akhtar, Salwa (KW)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,503

(22) Filed: May 24, 2010

(65) Prior Publication Data

US 2010/0232259 A1 Sep. 16, 2010

Related U.S. Application Data

(63) Continuation of application No. 11/743,986, filed on May 3, 2007, now Pat. No. 7,746,725.

(51) Int. Cl.
*G01V 1/40* (2006.01)
*G01V 1/50* (2006.01)

(52) U.S. Cl. ............... 367/31; 367/25; 367/75; 181/102
(58) Field of Classification Search .................. 367/25, 367/31, 35, 75, 86; 181/102, 105; 702/6, 702/11, 14
See application file for complete search history.

(56) References Cited

U.S. PATENT DOCUMENTS

| | | | |
|---|---|---|---|
| 4,853,903 A * | 8/1989 | Linville et al. | 367/46 |
| 6,839,633 B1 * | 1/2005 | Basaki et al. | 702/18 |
| 6,842,700 B2 * | 1/2005 | Poe | 702/13 |
| 7,746,725 B2 * | 6/2010 | Akhtar | 367/31 |

* cited by examiner

*Primary Examiner* — Ian Lobo
(74) *Attorney, Agent, or Firm* — Daryl R. Wright; Jody DeStefanis; Jeff Griffin

(57) ABSTRACT

Method for identifying one or more fracture clusters in a formation surrounding a reservoir. In one implementation, the method may include generating a P to S image, comparing the P to S image to one or more images from a borehole, and identifying one or more fracture clusters using the P to S image and the borehole images.

1 Claim, 9 Drawing Sheets

FRACTURE CLUSTERS IDENTIFICATION

CROSS-REFERENCE TO RELATED APPLICATIONS

This application claims benefit of U.S. provisional patent application Ser. No. 60/868,508, filed Dec. 4, 2006, and is a continuation of U.S. patent application Ser. No. 11/743,986, filed May 3, 2007, both of which are incorporated herein by reference for all purposes.

BACKGROUND

1. Field of the Invention

Implementations of various techniques described herein generally relate to sub-surface mapping in the oil and gas industry.

2. Description of the Related Art

The following descriptions and examples do not constitute an admission as prior art by virtue of their inclusion within this section.

Implementations of various techniques described herein are directed to identifying fractures and/or fracture clusters that exist in the formation surrounding a reservoir. These fractures may exist due to the nature of the formation, such as rocks, limestones and the like. Knowledge of the fractures or fracture clusters surrounding a reservoir may be important for well planning, production and the like for various reasons. For example, fractures may be used to assist the flow of hydrocarbons from the reservoir to which the fractures are connected. Further, knowledge of the fractures location may assist the geosteering of the pipes leading to the reservoir.

Currently, geologists use borehole images to identify these fractures. Such borehole images may include ultrasonic borehole images (UBI), oil-based mud images (OBMI), formation microscanned images (FMI) and the like. Unfortunately, the borehole images only provide images of the surface of the fractures. The depth, length and shape/pattern of the fractures and the distance between the fractures and the reservoir often remain unknown to geologists. As a result, geologists often use probability density functions to extrapolate the depth, length and shape of the fractures and the distance between the fractures and the reservoir. Therefore, a need exists in the art for an improved method to identify fractures or fracture clusters surrounding a reservoir.

SUMMARY

Described herein are implementations of various techniques for identifying one or more fracture clusters in a formation surrounding a reservoir. In one implementation, the fracture clusters may be identified by generating a P to S image, comparing the P to S image to one or more images from a borehole, and identifying the one or more fracture clusters using the P to S image and the borehole images.

In one implementation, the P to S image may be generated by acquiring seismic data from the formation surrounding the reservoir, separating the acquired seismic data into TRY, NRY, HMX and HMN components, and isolating the P to S image from the TRY, NRY, HMX and HMN components.

In one implementation, the P to S image may be isolated from the TRY, NRY, HMX and HMN components by building a model of the reservoir, generating simulated seismic data using the model, determining whether a variance between the simulated seismic data and the acquired seismic data is below a predetermined value, adjusting the model if the variance is greater than the predetermined value, and applying the model to the TRY, NRY, HMX and HMN components to isolate the P to S image. Alternatively, the P to S image may be isolated from the TRY, NRY, HMX and HMN components by applying at least one of an FK filter, a median filter and a tau p filter to the TRY, NRY, HMX and HMN components.

In one implementation, the P to S image may be compared to one or more borehole images by generating a fracture density histogram from a borehole image log, identifying areas of non-coherent signal in the P to S image along the borehole, and correlating areas with high levels of fracture density in the fracture density histogram with the areas of non-coherent signal in the P to S image.

In another implementation, the fracture clusters may be identified by determining the areas of non-coherent signal in the P to S image along the borehole that correlate with the areas with high levels of fracture density as fracture clusters, and determining the areas of non-coherent signal in the P to S image away from the borehole as fracture clusters.

The fracture clusters may be used in various applications such as to calculate a well drainage index by defining a fracture zone index based on the identified fracture clusters and calculating a weighing function, to provide visual insight to at least one of fracture modeling, fractured rock volume and rock properties, to make lithological prediction near a borehole, and to make production plans for the reservoir.

Described herein are also implementations of various technologies for a computer-readable medium having stored thereon computer-executable instructions which, when executed by a computer, cause the computer to: separate acquired seismic data into TRY, NRY, HMX and HMN components, isolate P, S, P to S and S to P images from the TRY, NRY, HMX and HMN components, select the P to S image, deconvolve the P to S image, stack the deconvolved P to S image, compare the P to S image to one or more images from a borehole, and identify one or more fractures in a formation surrounding a reservoir using the P to S image and the borehole images.

Described herein are also implementations of various technologies for a computer system, which may include a processor and a memory comprising program instructions executable by the processor to: isolate a P to S image from seismic data, deconvolve the P to S image, stack the P to S image, compare the P to S image to one or more borehole images, identify one or more fractures surrounding a reservoir using the P to S image and the borehole images and calculate a well drainage index using the identified fracture clusters.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
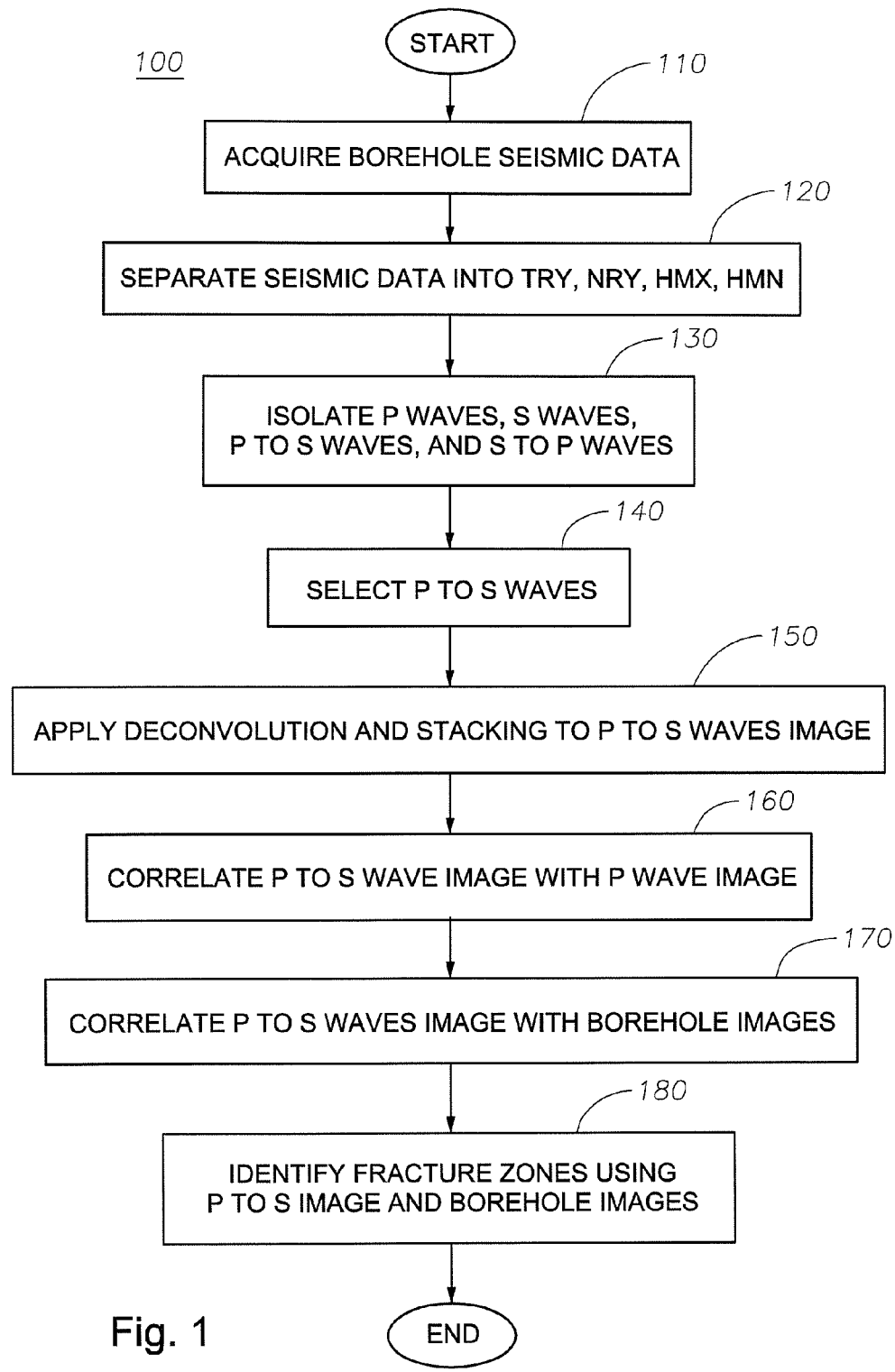
FIG. 1 illustrates a method for identifying fracture clusters in a formation surrounding a reservoir in accordance with one or more implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to identifying and providing a visual image of fracture clusters in the formation surrounding a borehole to assist in fracture mapping.

In general, P waves, also known as compressional waves, are waves with particles that oscillate in the direction in which the wave propagates. S waves, also known as shear waves, are waves with particles that oscillate perpendicular to the direction in which the wave propagates. P waves may be generated in at least three ways. That is, P waves may be emitted, produced when other P waves are reflected from surfaces with normal incidences, and produced when S waves are reflected from surfaces with non-normal incidences, referred to as converted compressional waves or S to P waves. Likewise, S waves may be generated in at least three ways. That is, S waves may be emitted, produced when other S waves are reflected from surfaces with normal incidences, and produced when P waves are reflected from surfaces with non-normal incidences, referred to as converted shear waves or P to S waves.

During a seismic survey, energy may be emitted by a source, reflected by interfaces within the earth and recorded by sensors. All of the types of waves described above may be present. In general, P waves are typically used to produce borehole seismic images. P to S waves are typically discarded as noise. However, interpretation of P to S waves may be used to determine rock properties, such as fracture density and the like. Because fractures in a formation may affect the rock strength, compressibility and physical behavior of the formation, S waves respond differently in fractured formations and non-fractured formations and are sensitive to fracture density and signal strength. For example, S waves may maintain coherency when reflected off competent rock, but become non-coherent when reflected off fractured rock. Coherent waves may be in phase, while non-coherent waves may be out of phase. Accordingly, P to S waves may be used to identify fracture clusters.

In general, in one or more implementations, borehole seismic data may be separated into TRY, NRY, HMX and HMN components allowing the P to S waves in the seismic data to be isolated. The isolated P to S waves may then be enhanced and correlated with conventional borehole images to provide an image of fracture clusters surrounding the borehole. This process may be accomplished for one or more boreholes and a fracture network model may be constructed for an area of interest. One or more techniques for generating a fracture cluster image in accordance with various implementations are described in more detail with reference to FIGS. 1-10 the following paragraphs.

FIG. 1 illustrates a method 100 for identifying fracture clusters in a formation surrounding a reservoir in accordance with one or more implementations of various techniques described herein. It should be understood that while the operational flow diagram 100 indicates a particular order of execution of the operations, in other implementations, the operations might be executed in a different order.

Figure 2:
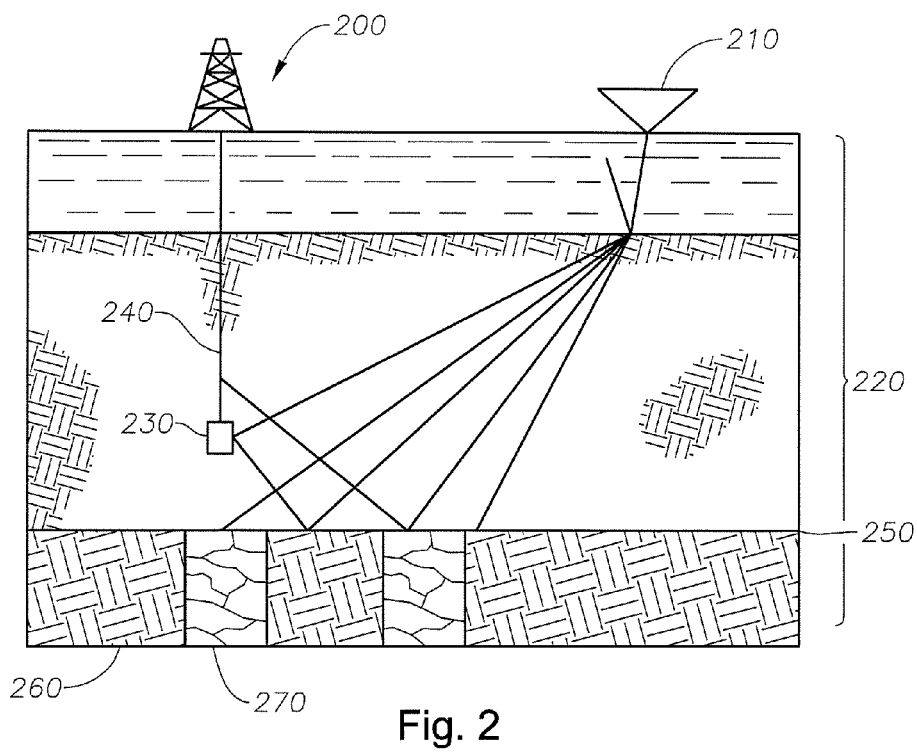
FIG. 2 illustrates a VSP acquisition system that may be used to acquire the seismic data in connection with one or more implementations of various techniques described herein.

At step 110, borehole seismic data may be acquired. It should be noted that the boreholes may be land or marine boreholes. Different types of borehole seismic surveys may be performed such as a vertical seismic profile (VSP) and the like. As such, the seismic data may be recorded by multi-component sensors disposed inside a borehole. FIG. 2 illustrates a VSP acquisition system 200 that may be used to acquire the seismic data in accordance with one or more implementations of various techniques described herein. The VSP acquisition system 200 may include a source 210 configured to discharge waves into the earth 220. The source 210 may be a vibrator or any other source that may be used to acquire seismic data. The VSP acquisition system 200 may further include one or more sensors 230 disposed inside a borehole 240. The sensors 230 may be configured to record the various waves discharged by the source 210 or the reflections thereof. The sensors 230 may be geophones, hydrophones and the like. In one implementation, the sensors 230 may include omni tilt accelerometers with the Z-axis orientated parallel to the borehole axis, and the X-axis and Y-axis (i.e., the horizontal components) orientated perpendicular to the borehole axis and mutually orthogonal to each other.

FIG. 2 further illustrates that P to S waves may be generated from the P to S conversion at the sea floor 250 as the P waves are reflected off both competent rock 260 and fractured rock 270. The P to S waves reflected off the competent rock 260 may maintain coherency, while the P to S waves reflected off the fractured rock 270 may become non-coherent.

Referring back to FIG. 1, at step 120, once the seismic data have been recorded, the data may be separated into TRY (tangent to the incident ray), NRY (normal to the incident ray), HMX (horizontal maximum) and HMN (horizontal minimum) components. To do this, the seismic data recorded on the X, Y and Z axes may first be rotated to find the direction with maximum energy. This position may be assumed to be the sensor facing the source position. Once oriented in this position, X, Y and Z planes may be determined. A polarization analysis, such as a hodogram analysis, may then be applied to the seismic data such that the P waves and P to S waves may be maximized on different planes. The azimuth and dip angles may then be computed. With the azimuth and dip angle, the TRY, NRY, HMX and HMN coordinates may be computed and the seismic data may be reconstructed along these four axes. This step may be repeated for each sensor. One example of separating the seismic data into the TRY, NRY, HMX and HMN components in accordance with various implementations is described in more detail with reference to FIGS. 3-5 in the following paragraphs.

Figure 3:
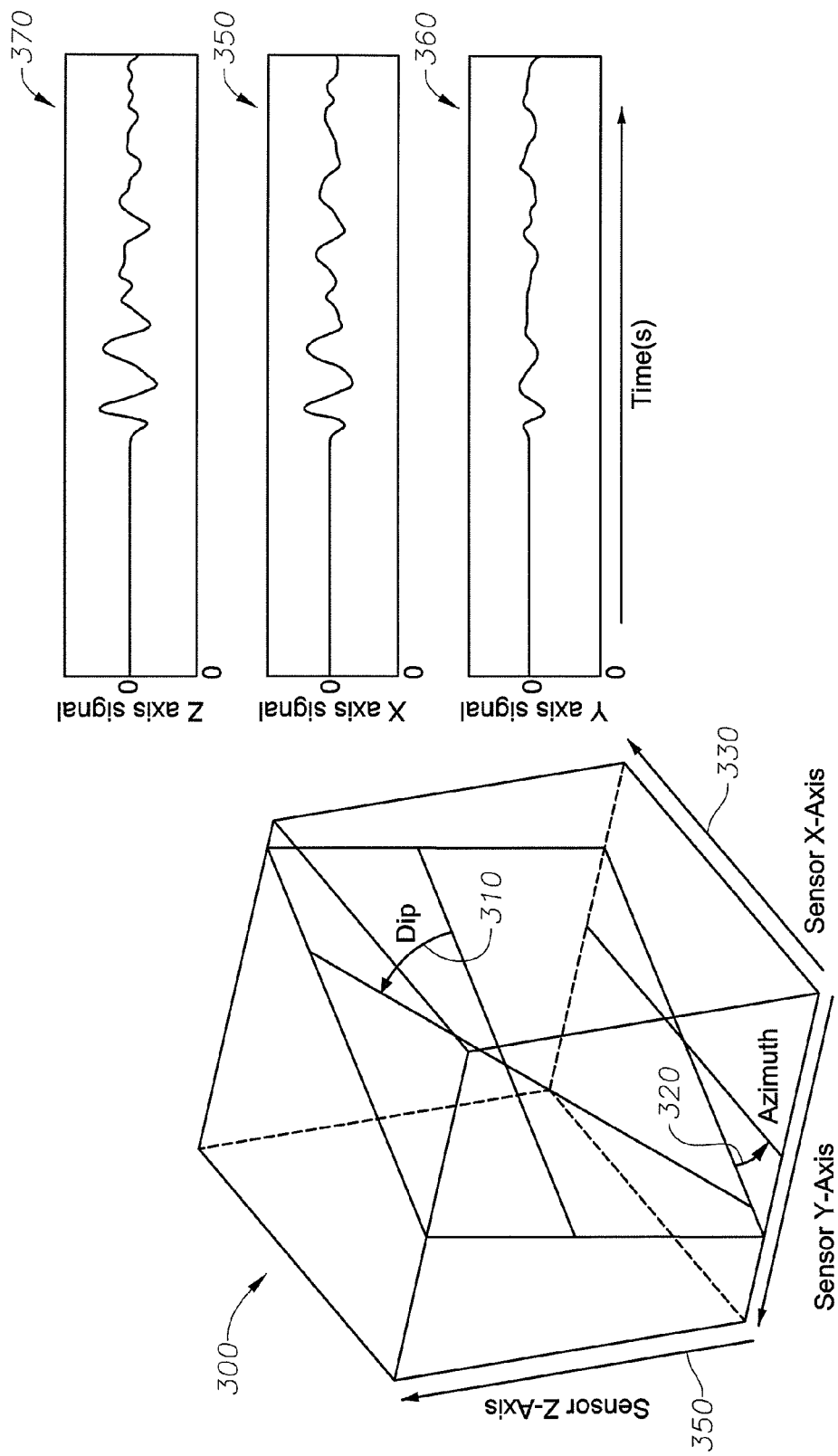
FIG. 3 illustrates a hodogram analysis that may be used to compute the polarization dip angle and the azimuth angle at each sensor in accordance with one or more implementations of various techniques described herein.

FIG. 3 illustrates a hodogram analysis 300 that may be used to compute the polarization dip angle 310 and the azimuth angle 320 at each sensor in accordance with one or more implementations of various techniques described herein. The seismic data recorded as an X-axis signal 350, Y-axis signal 360 and Z-axis signal 370 may be oriented. A polarization analysis, such as a hodogram analysis, may be applied to the seismic data to compute the polarization dip angle 310 and azimuth angle 320 at each sensor. The azimuth angle 320 may be arbitrarily measured relative to the axis of the X component 330 of the sensor. The dip angle 310 may be measured relative to the axis of the Z component 350 of the sensor. In addition, the spin direction of particle motion with reference to a coordinate axis, or polarization angle, may be determined.

Figure 4:
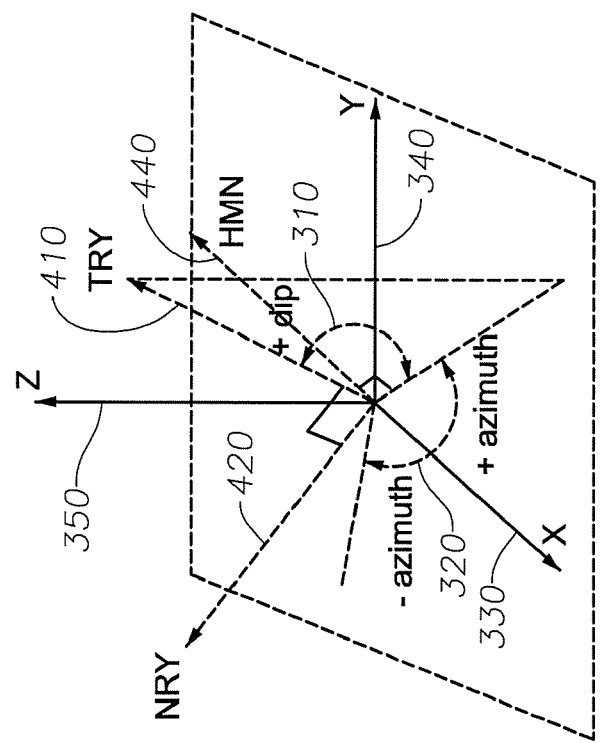
FIG. 4 illustrates angle conversions that may be used to rotate of the X, Y and Z components of the recorded data into the TRY, NRY, HMX and HMN components in accordance with one or more implementations of various techniques described herein.
Figure 4:
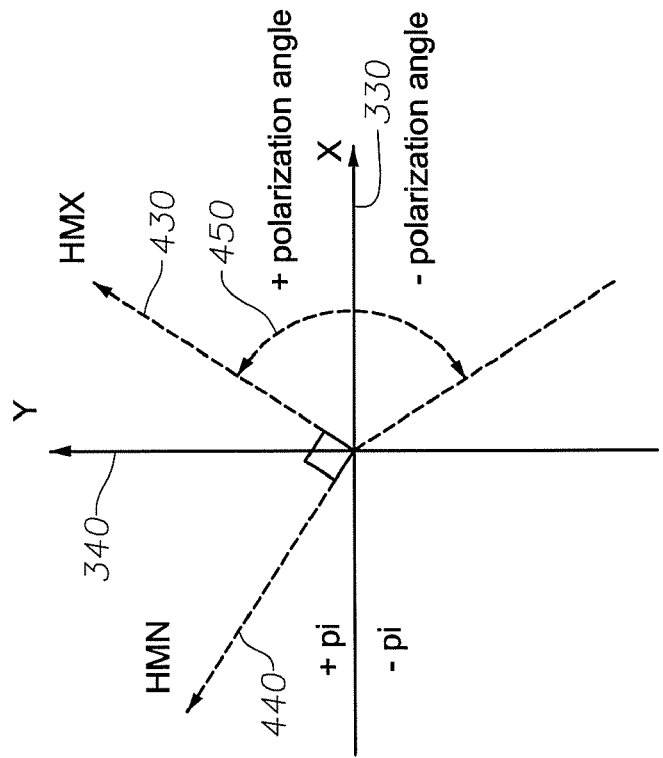

FIG. 4 illustrates angle conversions that may be used to rotate the X 330, Y 340 and Z 350 components of the recorded data into the TRY 410, NRY 420, HMX 430 and HMN 440 components in accordance with one or more implementations of various techniques described herein. The original X 330, Y 340 and Z 350 components of the recorded data may be rotated into the TRY 410, NRY 420, HMX 430 and HMN 440 components based on the dip angle 310, azimuth angle 320, and polarization angle 450 calculated in the polarization analysis.

Figure 5:
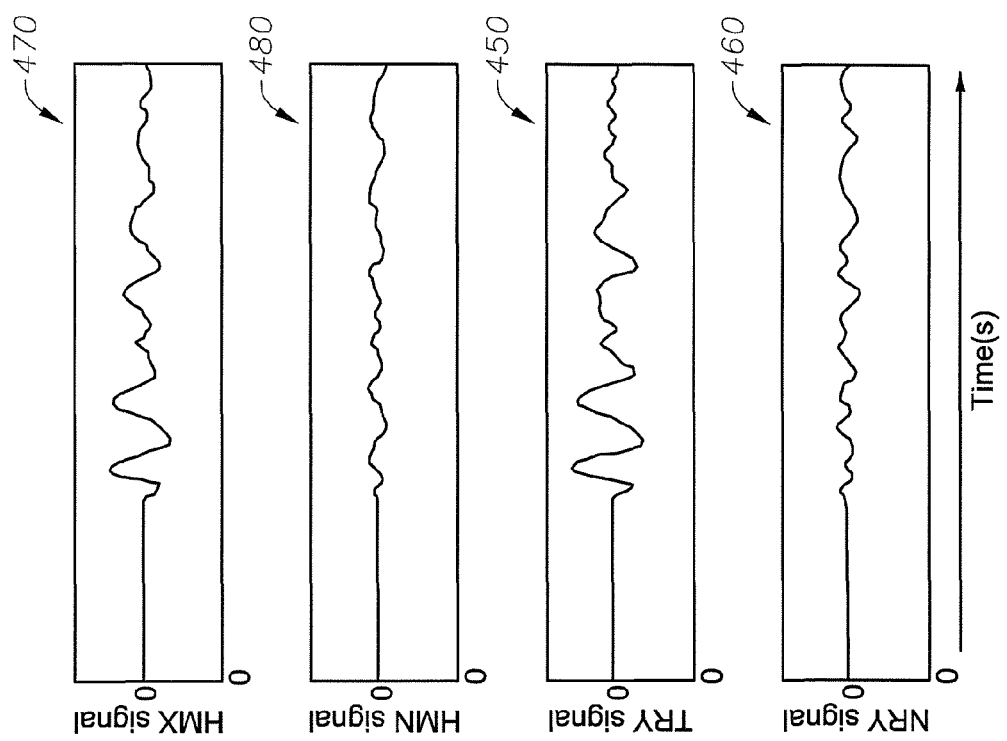
FIG. 5 illustrates the rotated seismic data after rotation into the TRY, NRY, HMX and HMN components in accordance with one or more implementations of various techniques described herein.
Figure 5:
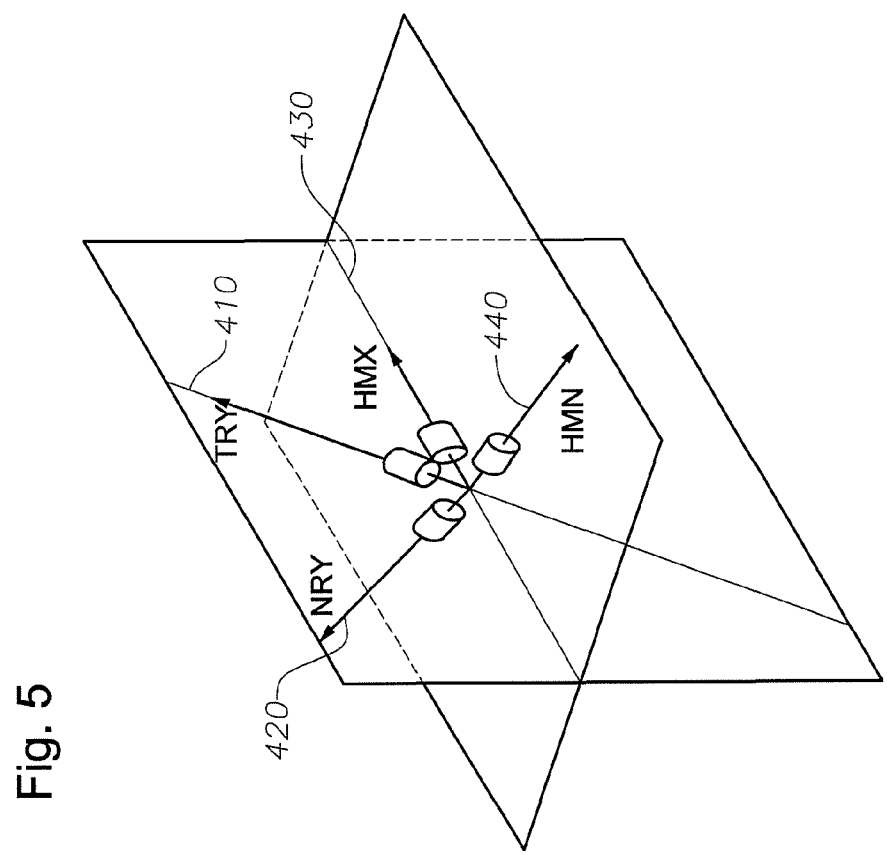

FIG. 5 illustrates the seismic data after rotation into the TRY 410, NRY 420, HMX 430 and HMN 440 components in accordance with one or more implementations of various techniques described herein. The seismic data may be reconstructed into four signals, the TRY signal 450, the NRY signal 460, the HMX signal 470 and the HMN signal 480. Each of these signals may include any combination of P waves, S waves, P to S waves and S to P waves. In addition, the waves may be a combination of up-going and down-going waves.

Referring back to FIG. 1, at step 130, the TRY, NRY, HMX and HMN components may be isolated into P waves, S waves, P to S waves and S to P waves. In general, P waves occur more prominently in vertical components of the acquired seismic data, whereas S waves appear more prominently in the horizontal components of the acquired seismic data. Various techniques may be used to isolate the P waves, S waves, P to S waves and S to P waves. In one implementation, the oriented wavefield made up of the TRY, NRY, HMX and HMN components may be decomposed into scalar up/down P & S wavefields, referred to as wavefield decomposition. Although the decomposition is described using elastic wavefield decomposition, it should be understood that in some implementations the decomposition may be performed using other techniques.

In one implementation, the isolation may be accomplished using a modeling technique. That is, a reservoir model may be built using various reservoir attributes, such as velocity, density, rock layer shapes/morphology and the like. Once the model is built, a simulation may be run using the model to generate simulated seismic data. The model may be simulated using a ray tracing operation. The simulated seismic data may then be compared with the recorded seismic data. If the variance between the simulated seismic data and the recorded seismic data is below a pre-determined value, e.g., less than 2%, then the model may be applied to the TRY, NRY, HMX and HMN components to isolate the P waves, S waves, P to S waves and S to P waves. In another implementation, one or more filters, such as FK filters, median filters, tau p filters and the like, may be used to enhance the isolation of the data (i.e., the P waves, S waves, P to S waves and S to P waves) after using the modeling technique.

In another implementation, in lieu of using the modeling technique, the P waves, S waves, P to S waves and S to P waves may be isolated using one or more digital filters such as FK filters, median filters, tau p filters and the like. For example, transforming the seismic data to the frequency domain, via a Fourier transform, may assist in isolating the various wave types because while the waves may overlap in time, the waves may not overlap in frequency. An FK filter may be applied in the frequency domain to the TRY, NRY, HMX and HMN components to isolate the P waves, S waves, P to S waves and S to P waves. Once FK filtered, the data (i.e., the P waves, S waves, P to S waves and S to P waves) may then be transformed back to the time domain. It should be understood that in some implementations the isolation may be performed using still other techniques such as oblique polarization filtering, parametric decomposition and the like.

At step 140, the P to S waves of the data may be selected. The P to S waves may be represented as a P to S image.

At step 150, deconvolution and stacking operations may be applied to the P to S image. Deconvolution may be applied to attenuate the multiples or pseudo reflections from the image. Various deconvolution techniques may be applied such as semblance deconvolution, prediction deconvolution, wave-shaping deconvolution and the like. Stacking may be applied to reduce noise and improve overall data quality. Various stacking techniques may be applied such as corridor stacking, CDP stacking and the like.

At step 160, the P to S image may be correlated with the P image from the same seismic data to ensure that the P to S waves were adequately isolated. It should be noted that in typical seismic data operations, deconvolution and stacking operations may be applied to the P image such that the P to S image resulting from step 150 may be correlated with a similarly processed P image. Correlation of the isolated P to S and P images may be used to determine if the P to S waves were adequately isolated because of various characteristics of P to S waves such as velocity. The P to S waves travel with a slower velocity than P waves in the same Earth medium. Because P to S and P waves have differing velocities and travel paths, the waves will have differing move-outs on time-depth axes. In addition, if the P to S waves have been adequately isolated, distinct slopes of events for both down and up going P to S waves will be identifiable and no substantial aliasing of events will be present.

Figure 6:
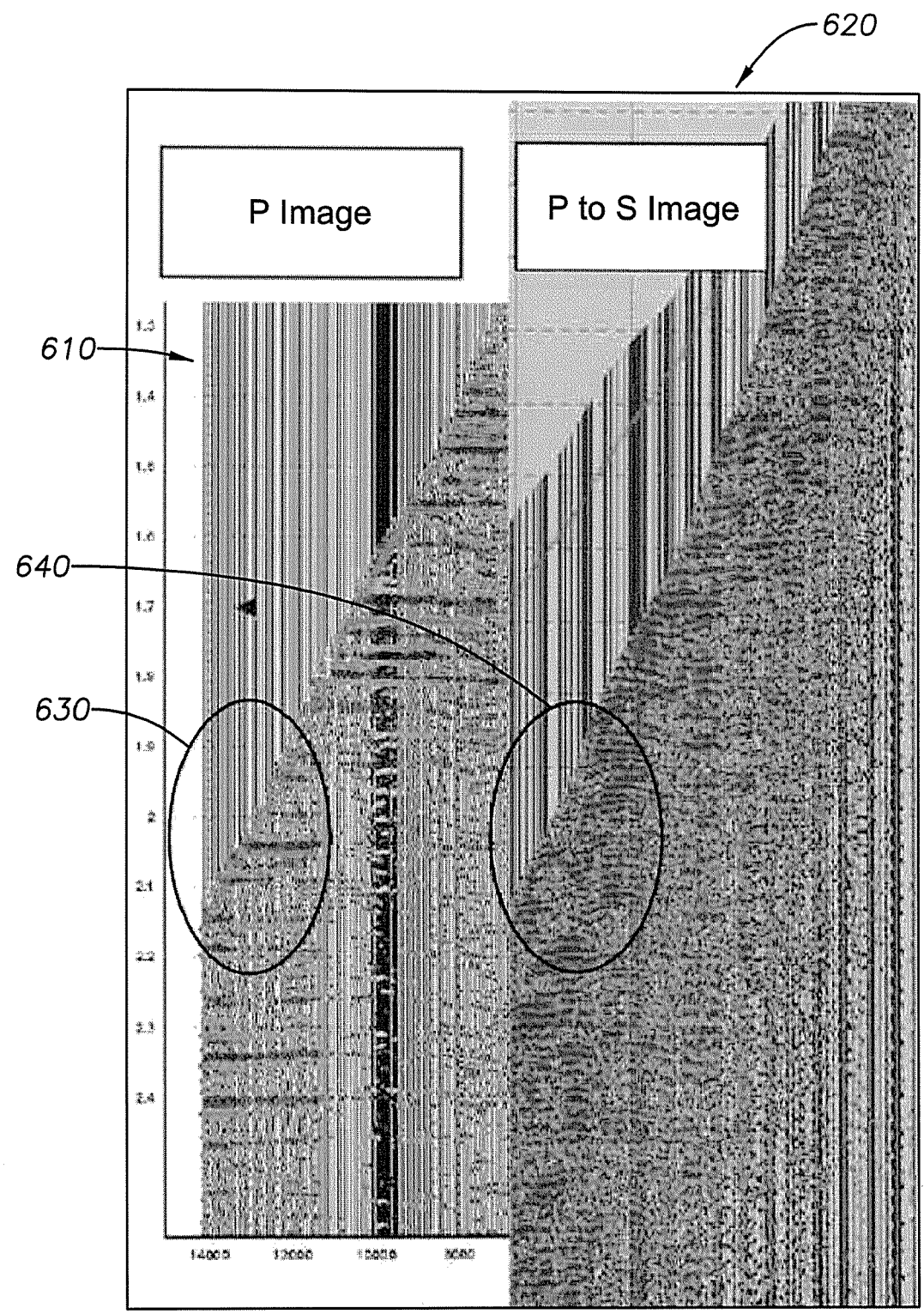
FIG. 6 illustrates a correlation between a P image and a P to S image in accordance with one or more implementations of various techniques described herein.

FIG. 6 illustrates a correlation between a P image 610 and a P to S image 620 in accordance with one or more implementations of various techniques described herein. A portion of the P image 630 may be correlated with a portion of the P to S image 640 such that the selected portions 630 and 640 represent the same area in the formation. The resolution of the P to S image may be much higher than that of the P image due to the fact that the S waves travel perpendicular to the motion of the medium particles.

Figure 7:
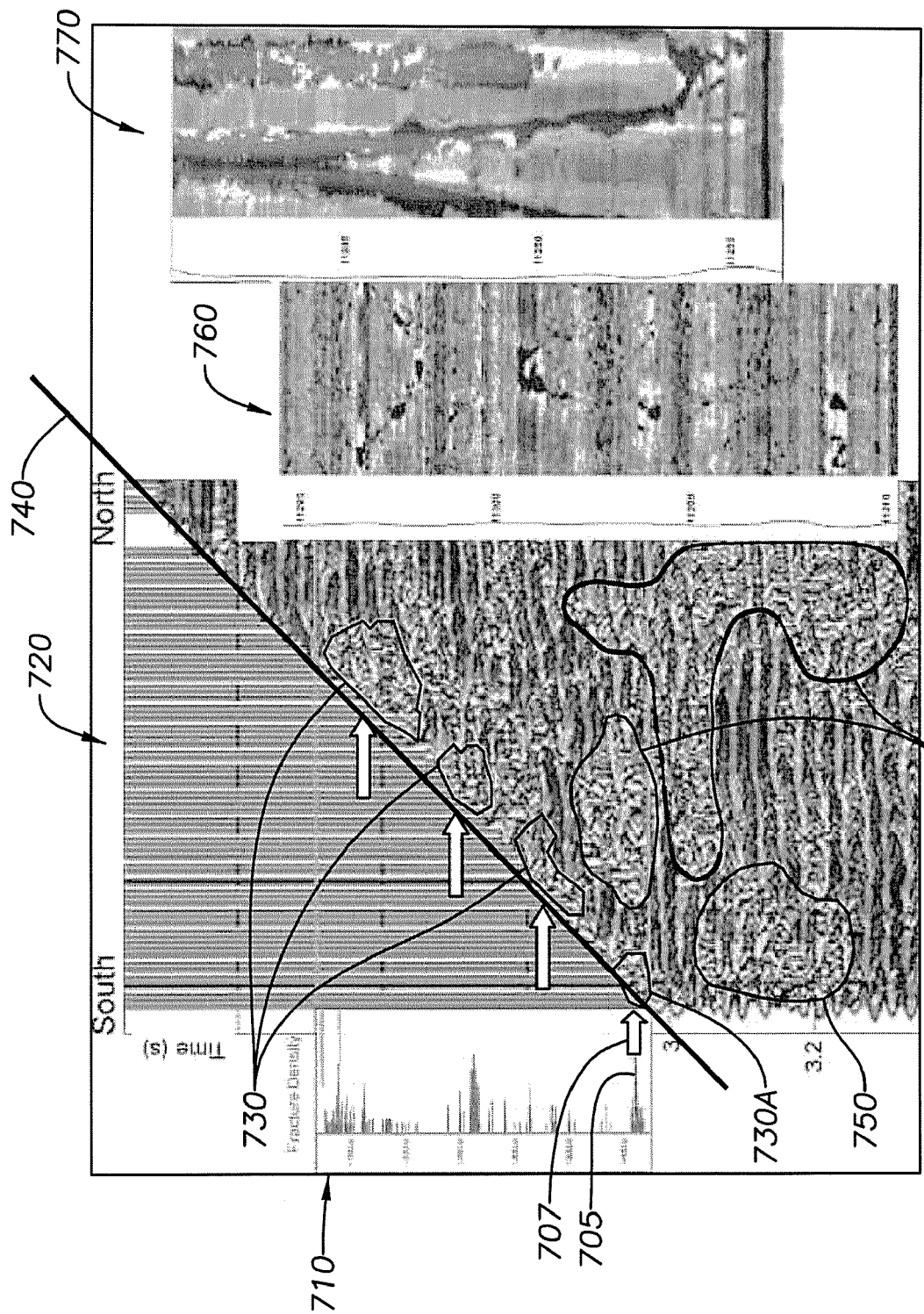
FIG. 7 illustrates the correlation of a P to S image with borehole images in accordance with one or more implementations of various techniques described herein.

At step 170, the P to S image may be correlated with borehole images, e.g., OBI, FMI, UBI and the like in order to integrate the data. For example, areas along the borehole with high fracture density may be correlated with areas of non-coherent signal along the borehole in the P to S image. FIG. 7 illustrates the correlation of a P to S image with borehole images in accordance with one or more implementations of various techniques described herein. A fracture density histogram 710 interpreted from a borehole image log may be overlain in time on the P to S image 720. Areas of non-coherent signal may be identified along a two way time-depth curve 740 which lies along the borehole interior surface. FIG. 7 shows that high levels of fracture density on the fracture density histogram 710 may correlate with areas of non-coherent signal 730 along the two way time-depth curve 740 on the P to S image 720. For example, an area with high levels of fracture density 705 on the fracture density histogram 710 correlates, shown by the white arrow 707, with a specific area of non-coherent signal $730_A$. Areas of non-coherent signal 730 may be interpreted to correspond to fracture clusters. Areas with a high concentration of fracture clusters may be referred to as fracture zones. As such, it may be inferred from FIG. 7 that a number of fracture clusters may be disposed along the borehole, if areas of non-coherent signal 730 are disposed along the two way time-depth curve 740. It may further be inferred from FIG. 7 that fracture clusters may be disposed away from the borehole, if areas of non-coherent signal 750 are disposed away from the two way time-depth curve 740. Thus, the P to S image may be used to identify fracture clusters surrounding a borehole.

In FIG. 7, the two borehole UBI images 760 and 770 may be included in the correlation process to provide additional analysis information, such as correlation of fracture cluster depth, dip, azimuth attributes and the like.

At step 180, fracture clusters or fracture zones may be identified in the area surrounding a borehole using the correlated P to S image and the borehole images. In this manner, implementations of various techniques described herein may allow for more accurate geological models of fracture networks and provide visual images with reasonable resolution to map fracture clusters affecting the reservoir performance.

In one implementation, the method 100 may be repeated for various areas surrounding a single borehole or multiple boreholes. The resulting data may be used to construct a fracture network in an area of interest.

Figure 8:
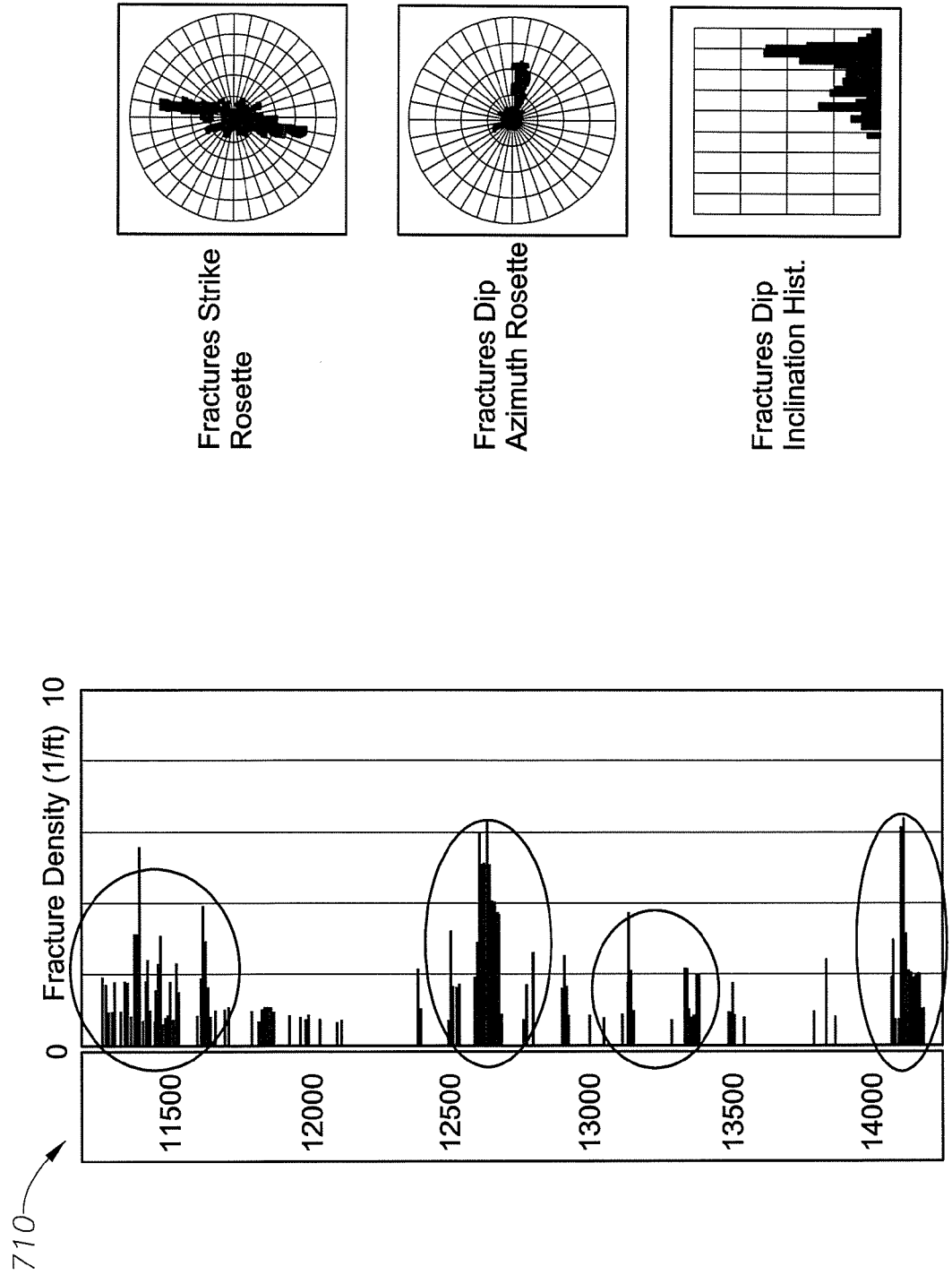
FIG. 8 illustrates an example of the fracture cluster characterization schema in accordance with one or more implementations of various techniques described herein.

In another implementation, prior to the execution of step 120, a fracture cluster characterization schema may be developed in the reservoir area of interest. This step may include developing fracture density curves interpreted from image logs, fracture strike rosettes, dip rosettes and fracture inclination histograms. FIG. 8 illustrates an example of the fracture cluster characterization schema in accordance with one or more implementations of various techniques described herein. The fracture density curve 710 was used to create the composite display in FIG. 6.

The various techniques described herein may be used in a number of applications, such as to provide visual insight to fracture modeling, fractured rock volume and rock properties for geo-mechanics studies; to provide help in understanding typical lithology behavior around and away from the well bore; to produce reliable results for effective and economical decisions on well planning, drilling optimization and well testing; and the like.

For example, in one application the various techniques may be used in a method for lithological prediction in the vicinity of the borehole. In one implementation, well log data may be used to estimate lithology and facies in the vicinity of the borehole. The non-coherent P to S events in the P to S image may then be calibrated with the lithological estimate.

As another example, the various techniques may be used in creating a production plan for a reservoir. More specifically, the P to S image may be used to define a 2D or 3D well drainage index. Further, various implementations may be used for predicting the productivity of wells based on the establishment of a correlation between the well drainage index, $IF_{2D}$ or $IF_{3D}$, and well productivity data obtained on producing wells.

Well drainage indices may be calculated by first defining a fracture zone index, $F_{2D}(D,r)$ or $F_{3D}(D, r, A)$, from the fracture clusters or fracture zones identified in step 180 of method 100. The fracture zone index, $F_{2D}(D,r)$ or $F_{3D}(D, r, A)$, is a function of the true vertical depth, D, horizontal distance to the well, r, and azimuth angle with respect to North, A. It should be noted that if the P to S image is a 2D seismic image, then the fractured zone index may be a 2D index represented as $F_{2D}(D,r)$ which is a function of only the true vertical depth, D, and horizontal distance to the well, r, and not the azimuth angle with respect to North, A. The fracture zone index of a given point of coordinates (D, r, A) may have a value of 1, if the point is in a fractured zone, or a value of 0, if the point belongs to a non-fractured zone. The fracture zone index may be based on the manual contouring of the relevant fractured zones, as defined by method 100, or it may be the product of automatic image processing, i.e., through calculating a local image coherency index and defining a threshold on this coherency.

The fractured zone index, $F_{2D}(D,r)$ or $F_{3D}(D, r, A)$, may then be used to calculate a well drainage index, $IF_{2D}$ or $IF_{3D}$, which may be correlated to the surface or volume fraction of the fractured zones around the well. The general form of the indices is as follows:

$$IF_{2D}=\int_S F_{2D}(D,r)w_{2D}(D,r)dD\,dr \qquad (1)$$

$$IF_{3D}=\int_V F_{3D}(D,r,A)w_{3D}(D,r)dD\,rdr\,dA \qquad (2)$$

The integration may be made over either the 2D cross-sectional area S around the well containing the seismic data or the 3D volume V around the well containing the seismic data. The weighing function, $w_{2D}(D,r)$ or $w_{3D}(D,r)$, may be introduced to reflect the fact that fractured zones closer to the well may have a greater importance on the well productivity than fractured zones located at a greater distance. The weighing function may be either a constant or a decreasing function of the distance r to the well. The weighing function may also be a function of the depth D, because the VSP data does not have a uniform extension around the well versus depth.

Figure 9:
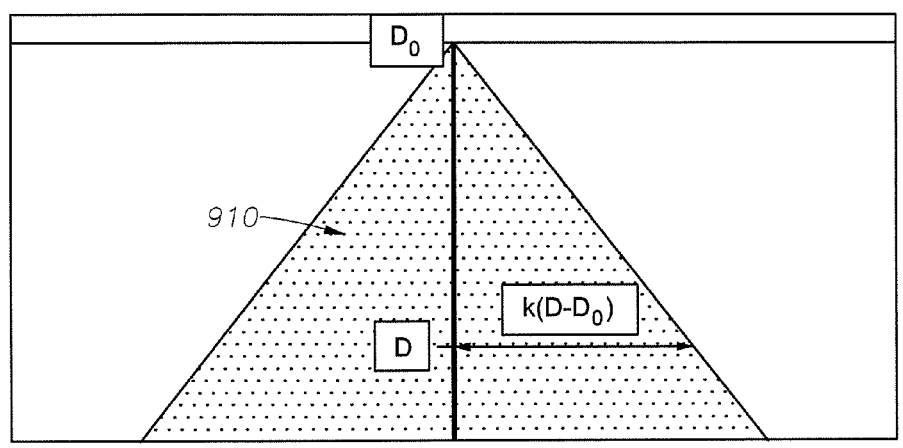
FIG. 9 illustrates a conic shaped VSP area that may be used for weighing function calculation in accordance with one or more implementations of various techniques described herein.

The weighing function for the 2D index ($w_{2D}(D,r)$) and the weighing function for the 3D index ($w_{3D}(D,r)$) may be different. The weighing function may be defined in order to provide a "normalized" index according to the following formulas:

$$2\pi\int_{R(D)} w_{3D}(D,r)rdr=1 \qquad (3)$$

$$\int_{R(D)} w_{2D}(D,r)dr=1 \qquad (4)$$

where R(D) is the range of value for the distance, r, to the well at the depth D. For a conic shaped VSP area, R(D) is an interval of the form $[r_w, k(D-D_0)]$ where $r_w$ is the wellbore radius and $D_0$ is the top of the cone. FIG. 9 illustrates a conic shaped VSP area that may be used for weighing function calculation in accordance with one or more implementations of various techniques described herein.

As an example, the following forms of weighing functions may be selected.

$$w_{2D}(D,r) = g_{2D}(D)/r \quad (5)$$

$$w_{3D}(D,r) = g_{3D}(D)/r \quad (6)$$

Applying the "normalized" index equations (3) and (4) respectively to the weighing functions (5) and (6) respectively may lead to the following equations.

$$g_{2D}(D) = 1 \Big/ \ln\!\left(\frac{k(D-D_0)}{r_w}\right) \quad (7)$$

$$g_{3D}(D) = 1/2\pi \Big/ \ln\!\left(\frac{k(D-D_0)}{r_w}\right) \quad (8)$$

In another example, for power laws with exponent $n \ne 1$, the following forms of weighing functions may be selected.

$$w_{2D}(D,r) = g_{2D}(D)/r^n \quad (9)$$

$$w_{3D}(D,r) = g_{3D}(D)/r^n \quad (10)$$

Applying the "normalized" index equations (3) and (4) respectively to the weighing functions (9) and (10) respectively may lead to the following equations.

$$g_{2D}(D) = (n-1) \Big/ \left(\frac{1}{r_w^{n-1}} - \frac{1}{(k(D-D_0))^{n-1}}\right) \quad (11)$$

$$g_{3D}(D) = (n-1)/2\pi \Big/ \left(\frac{1}{r_w^{n-1}} - \frac{1}{(k(D-D_0))^{n-1}}\right) \quad (12)$$

Thus, well drainage indices may be calculated. The well drainage indices may be correlated to productivity data from producing wells and the results may be used to form a production plan for the reservoir.

Figure 10:
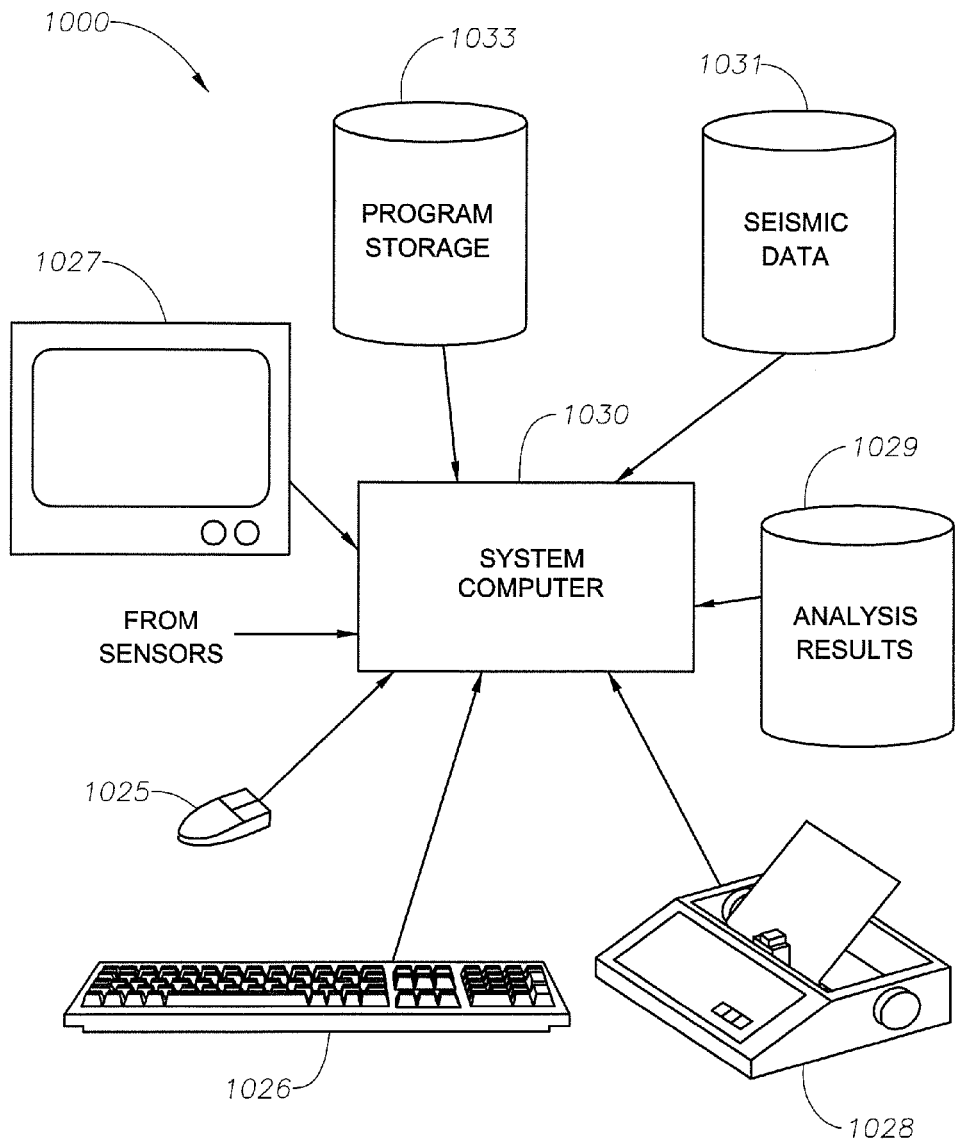
FIG. 10 illustrates a computing system, into which implementations of various techniques described herein may be implemented.

FIG. 10 illustrates a computing system 1000, into which implementations of various techniques described herein may be implemented. The computing system 1000 may include one or more system computers 1030, which may be implemented as any conventional personal computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 1030 may be in communication with disk storage devices 1029, 1031, and 1033, which may be external hard disk storage devices. It is contemplated that disk storage devices 1029, 1031, and 1033 are conventional hard disk drives, and as such, will be implemented by way of a local area network or by remote access. Of course, while disk storage devices 1029, 1031, and 1033 are illustrated as separate devices, a single disk storage device may be used to store any and all of the program instructions, measurement data, and results as desired.

In one implementation, seismic data from the receivers may be stored in disk storage device 1031. The system computer 1030 may retrieve the appropriate data from the disk storage device 1031 to process seismic data according to program instructions that correspond to implementations of various techniques described herein. The program instructions may be written in a computer programming language, such as C++, Java and the like. The program instructions may be stored in a computer-readable medium, such as program disk storage device 1033. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1030. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1030 may present output primarily onto graphics display 1027, or alternatively via printer 1028. The system computer 1030 may store the results of the methods described above on disk storage 1029, for later use and further analysis. The keyboard 1026 and the pointing device (e.g., a mouse, trackball, or the like) 1025 may be provided with the system computer 1030 to enable interactive operation.

The system computer 1030 may be located at a data center remote from the survey region. The system computer 1030 may be in communication with the receivers (either directly or via a recording unit, not shown), to receive signals indicative of the reflected seismic energy. These signals, after conventional formatting and other initial processing, may be stored by the system computer 1030 as digital data in the disk storage 1031 for subsequent retrieval and processing in the manner described above. While FIG. 10 illustrates the disk storage 1031 as directly connected to the system computer 1030, it is also contemplated that the disk storage device 1031 may be accessible through a local area network or by remote access. Furthermore, while disk storage devices 1029, 1031 are illustrated as separate devices for storing input seismic data and analysis results, the disk storage devices 1029, 1031 may be implemented within a single disk drive (either together with or separately from program disk storage device 1033), or in any other conventional, manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying one or more fracture clusters in a formation surrounding a reservoir, comprising:
   generating a seismic signal with a seismic source at a distant location;
   generating an image from the seismic signal;
   acquiring seismic data from the formation surrounding the reservoir;
   separating the acquired seismic data into TRY, NRY, HMX and HMN components;
   isolating the image from the TRY, NRY, HMX, and HMN components;
   comparing the image to one or more other images from a borehole; and
   identifying the one or more fracture clusters using the image and the other borehole images.

* * * * *